G. HALTER.
APPARATUS FOR THE PRODUCTION OF OXYGEN AND HYDROGEN GASES.
APPLICATION FILED AUG. 27, 1913.
1,172,885.
Patented Feb. 22, 1916.
3 SHEETS—SHEET 1.
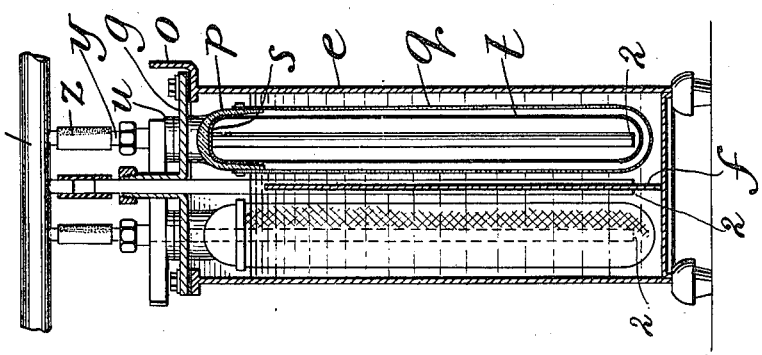
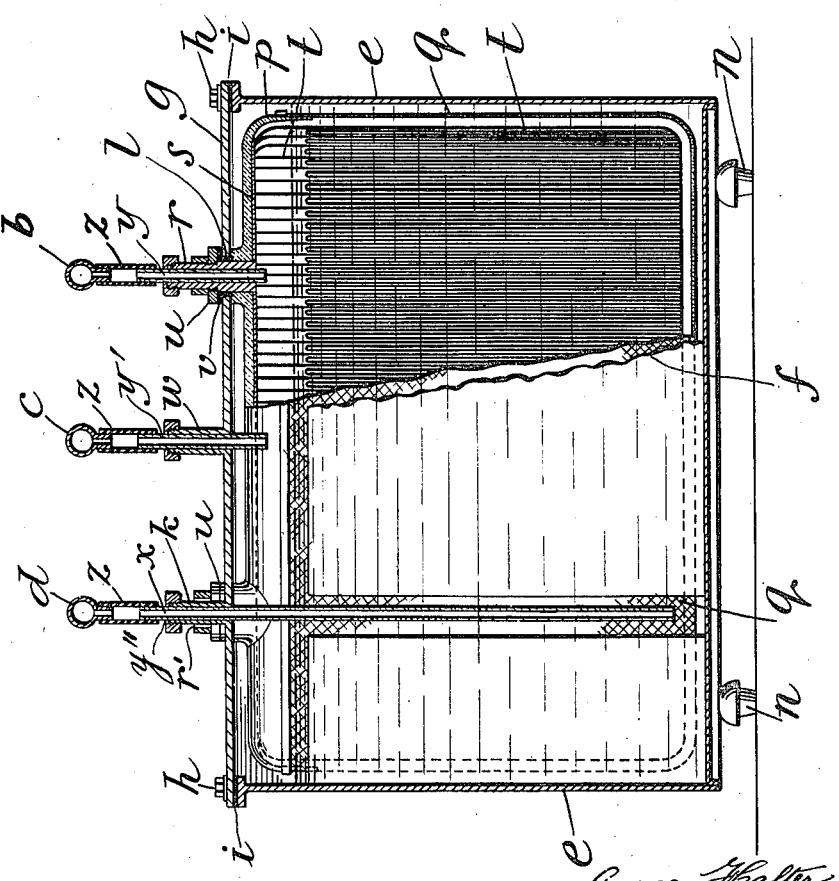

G. HALTER.
APPARATUS FOR THE PRODUCTION OF OXYGEN AND HYDROGEN GASES.
APPLICATION FILED AUG. 27, 1913.

1,172,885.

Patented Feb. 22, 1916.

G. HALTER.
APPARATUS FOR THE PRODUCTION OF OXYGEN AND HYDROGEN GASES.
APPLICATION FILED AUG. 27, 1913.

1,172,885.

Patented Feb. 22, 1916.
3 SHEETS—SHEET 3.

Witnesses:

George Halter
Inventor

UNITED STATES PATENT OFFICE.

GEORGE HALTER, OF NEW YORK, N. Y., ASSIGNOR TO DAVIS-BOURNONVILLE COMPANY, OF NEW YORK, N. Y., A CORPORATION OF NEW YORK.

APPARATUS FOR THE PRODUCTION OF OXYGEN AND HYDROGEN GASES.

1,172,885.  Specification of Letters Patent. Patented Feb. 22, 1916.

Application filed August 27, 1913. Serial No. 786,913.

*To all whom it may concern:*

Be it known that I, GEORGE HALTER, a citizen of the French Republic, and a resident of the borough of Manhattan, city, county, and State of New York, have invented certain new and useful Improvements in Apparatus for the Production of Oxygen and Hydrogen Gases, of which the following is a specification.

This invention has reference to a novel apparatus for generating oxygen and hydrogen gases. Other apparatus for the production of oxygen and hydrogen gases are costly in operation because of their resistance to the electric current, and bulky and require a considerable floor space.

My apparatus consists of two electrodes of large electrical capacity situated in close proximity and having the slightest possible resistance, to wit, the solution of the alkaline salt, and therefore yields greatly increased quantities of oxygen and hydrogen in proportion to the floor space occupied.

My apparatus yields oxygen and hydrogen gases at low cost for welding and chemical purposes, and of the highest possible purity for medicinal uses since all the gases generated are formed only on the electrodes; all the other parts of the apparatus being composed of insulating, or non-conducting material.

The maximum contact surface for contact with the caustic solution is afforded in my apparatus by positive electrodes composed of wire vertically arranged which arrangement also permits the free escape of the oxygen gas formed.

The invention also comprises certain useful features of construction, which will be hereinafter pointed out.

These objects are accomplished by the following described apparatus of simple and inexpensive construction, of very low consumption of electrical energy.

The invention is illustrated in the accompanying drawings in which the same letters refer to the same parts.

Figure 3:
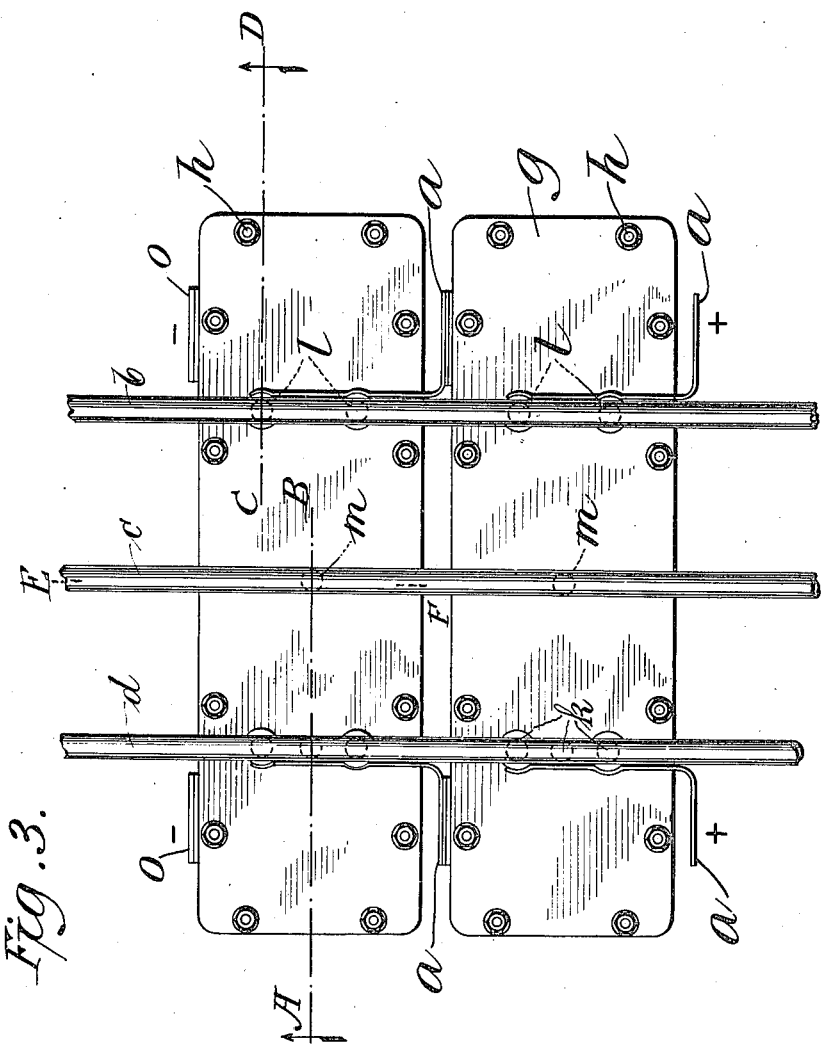
Figure 4:
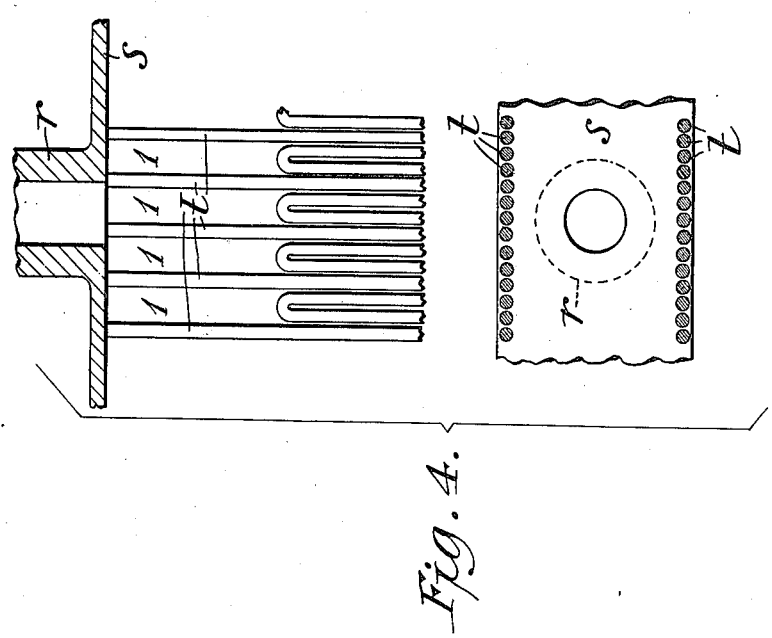
Figure 5:
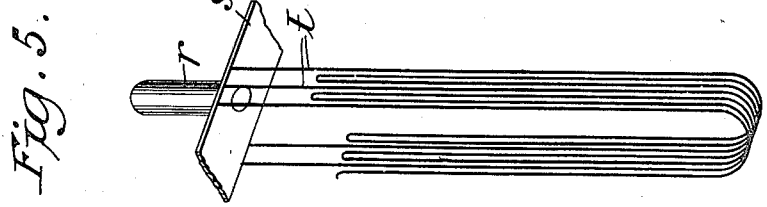

Figure 1, is a longitudinal section of Fig. 3, at the center of the generator from A, to B, and at the center of the positive electrode from C to D. Fig. 2, is a cross-section of Fig. 3, at the center E—F of the generator. Fig. 3, represents the plan of a group of two generators showing (*a*) the electrical connections and the arrangement of the take-off pipes for the generated gases, (*b*) for the oxygen gas, and (*c*) for the hydrogen gas, and the arrangement of the main pipe (*d*) for the distribution of water. Figs. 4 and 5 show a few details of the construction of the positive electrode.

Referring to the drawings, the apparatus for the production of oxygen and hydrogen gases, consists primarily of the following parts. A tank (*e*), made of sheet iron, bent and welded, which tank (*e*) can be separated by iron plates (*f*) welded to the sides and bottom of the tank, forming one or more compartments, each constituting a unit of production. The tank (*e*) is closed on top by an iron cover (*g*), which can be welded all around so as to render the tank gas tight, or by a cover made of iron, cast-iron, or any insulating material, fastened by bolts and nuts (*h*) and made gas tight by a lead or rubber gasket (*i*). The bottom of the tank (*e*) is formed by a plate of iron welded to the sides. The described method of welding the various parts together of which the apparatus is composed produces a solid unit of the metallic pieces by the autogenic process leaving no connecting surface or seams of a different metal or flux between the welded parts whereby the resistance is reduced to a minimum. The cover (*g*) has three openings, (*k*) for the water distribution pipes; two openings (*l*) for taking off the oxygen gas; and one opening (*m*) for taking off the hydrogen gas. The tank (*e*) rests on four feet (*n*), of porcelain or other insulating material, which insulates same from the ground. On the outside of the tank (*e*) are welded plates (*o*) Fig. 2, which receive the negative conductor of the electric current, which said current is distributed to every portion of said tank (*e*). Since the surface of said tank (*e*) is very large a large quantity of electricity; more than five hundred amperes, can pass through same with very little resistance.

In every compartment or section of the tank (*e*) is an inside chamber, entirely closed with the exception of two openings at the top. This inside chamber is composed of two sections or parts, one (*p*) termed a "separator", of porcelain or any other non-conducting material resisting the action of oxygen gas and caustic solution, and the other (*q*) is an asbestos diaphragm thick enough to avoid any mixture of the gases, and closed at the bottom forming a sack. This asbestos sack is securely fastened to the separator (p). In this way a complete non-conducting inclosure for the anode is provided.

Inside of each such chamber is the positive electrode consisting of two tubes (r) and (r'), of nickel, or nickel-plated iron, passing through the two openings in the separator (p), to which tubes is welded a plate (s) of nickel or nickel-plated iron, covering the inside portion of the separator (p) and to which plate are welded wires (t) of nickel or nickel-plated iron. These portions of the positive electrode, (r), (r'), (s), and (t), may be composed of any material which conducts electricity and which resists, or is suitably protected, from the action of oxygen gas and caustic solution.

The wires (t) are arranged vertically as shown in detail in Figs. 1, 4, and 5, and permit the passage of a large quantity of electricity with very little resistance. The tube (r) is used for the escape of the oxygen gas, and the tube (r') for the supply and distribution of water.

The cover (g), separator (p) and positive electrode (r, r', s, t) are fastened together by nuts (u) with an intervening washer or gasket of insulating material (v).

Inside of the tubes (r) and (r') and of the tube (w) for the escape of the hydrogen gas, and of the tube (x) for the supply and distribution of the water, are other tubes (y, y', y²) respectively of porcelain or other insulating material, to which a hose (z) of rubber, or other insulating material, connects with the "take-off" pipes (b) for oxygen gas, (c) for hydrogen gas and (d) for the distribution of water.

The iron, or steel, tank (e) is filled up to the separator (p) with a solution of caustic of the strength most suitable for the operation of the generator.

With this system of complete insulation, the only electrical contact between the two electrodes, i. e., the positive electrode (r, r', s, t) and the negative electrode, the tank (e), is the caustic solution filling the tank, and this is the only resistance of the generator.

When the oxygen and hydrogen generator is in operation, the current passes from the positive electrode, through the caustic solution to the negative electrode in each compartment, and it will be understood that a plurality of the cells may be connected in series, as indicated in Fig. 3. Water is decomposed by the electric current into its two component gases, oxygen and hydrogen. Oxygen is formed on the surface of all the wires of the positive electrode and proceeds vertically through the opening (1) Fig. 4, and escapes by the porcelain tube (y). Hydrogen is formed on the surface of the negative electrode, i. e., the whole inside of the tank (e), in contact with the caustic solution, and rises between the diaphragm (q) and the sides of the tank (e), and passes the separator (p) and escapes through the porcelain tube (y').

All the oxygen outlets from the generators are connected to the same "take-off" pipe (b) and the gas passes directly to the oxygen gas holder where it is stored at a suitable pressure. Similarly, all the hydrogen outlets are connected to the same "take-off" pipe (c) and the gas passes directly to the hydrogen gas holder where it is stored at a suitable pressure.

The water decomposed into oxygen and hydrogen gases is continuously replaced by water from a suitable reservoir through the supply pipe (d) and the tubes (y'') which later deliver the water at the bottom of the generator at (2) Fig. 2, and creates a circulation of the caustic solution and thereby maintains it at a uniform strength throughout.

I claim as my invention;

1. An electrolytic cell for the generation of oxygen and hydrogen comprising a container for electrolyte provided with anode and cathode, and a non-conducting inclosure for the anode to separate the gases and prevent electrolytic action except on the surfaces of the electrodes, the said inclosure comprising a separator of solid non-conducting material above the electrolyte and projecting a suitable distance below the surface of the same, and a suspended sack of non-conducting material secured to the separator and inclosing the anode below the surface of the liquid.

2. In an electrolytic cell for the generation of oxygen and hydrogen, the combination with an anode and cathode, of a complete non-conducting inclosure for the anode comprising a separator of porcelain or other suitable non-conducting and oxygen-resisting material over the anode, said separator having a closed top provided with an oxygen outlet and sides extending below the surface of the electrolyte, and an asbestos sack secured to and suspended below the separator and inclosing the anode below the surface of the electrolyte.

3. An electrolytic cell for the generation of oxygen and hydrogen comprising a tank capable of holding the electrolyte and constituting the cathode, an anode suspended in the electrolyte, a separator of porcelain or equivalent non-conducting material over the anode and inclosing the oxygen-collecting chamber, and an asbestos sack secured to and suspended below said separator and inclosing the anode below the surface of the liquid, said separator and sack constituting a complete non-conducting inclosure for the anode.

4. An electrolytic cell for the generation of oxygen and hydrogen comprising a tank capable of holding the electrolyte and constituting the cathode, a cover for the tank, an anode suspended in the electrolyte from the cover, a separator of porcelain or equivalent non-conducting material supported over the anode with its sides extending below the surface of the electrolyte, an asbestos sack secured to and suspended below said separator and inclosing the anode below the surface of the liquid, said separator and sack constituting a complete non-conducting inclosure for the anode, means for conducting off the oxygen from the interior of the separator, and means for conducting off hydrogen from the space beneath the cover outside of the separator.

5. In an electrolytic cell for the generation of oxygen and hydrogen, an anode comprising wires united in the form of a hollow body and a complete non-conducting inclosure for said anode comprising a separator of porcelain or equivalent material over the anode with its sides extending below the surface of the electrolyte, and an asbestos sack secured to and suspended below said separator and inclosing the anode below the liquid level.

6. In a cell for electrolytic dissociation of water, the combination of a tank, a partition dividing the interior of the tank into narrow vertically-arranged compartments, said partition and the walls of the tank together constituting the cathode part, a cover for the tank, separators of non-conducting material and inverted trough form supported from and below said top lengthwise of the compartments, anodes of hollow oblong horizontal section suspended in the compartments below the separators, and sacks depending from said separators and inclosing the anodes.

7. In a cell for electrolytic dissociation of water, the combination with anode and cathode, of a separator over the anode, the same being of non-conducting material resistant to the action of the electrolyte and oxygen and of inverted trough form, and a sack of non-conducting material depending from said separator and inclosing the anode below the liquid level.

8. In a cell for electrolytic dissociation of water, the combination with a tank, a top, a separator of non-conducting material and inverted trough form beneath said top, an anode extending downward below the separator, and means connected to the anode and extending through the separator to support the anode and separator from said top.

9. In a cell for electrolytic dissociation of water, the combination with a tank having a top, a separator of non-conducting material and inverted trough form beneath said top, an anode extending below said separator, and a hollow support for said anode extending through the separator and secured to said top, said hollow support constituting also an offtake for the oxygen.

10. In a cell for electrolytic dissociation of water, the combination of a separator of non-conducting material and inverted trough form, a conducting bar within the chamber of said separator, and an anode comprising adjacent spaced side portions united at the top to said bar.

11. In a cell for electrolytic dissociation of water, the combination of a tank having a top, a separator of non-conducting material and inverted trough form beneath said top, a conducting bar beneath the top of the chamber of said separator, an anode comprising adjacent spaced side portions united at the top to said bar, conducting and supporting members extending from said bar through the top of said separator and fastened to the top for the tank, and a diaphragm of non-conducting material fastened to said separator and inclosing the anode.

12. In a cell for electrolytic dissociation of water, the combination of a tank constituting a cathode, a top beneath which hydrogen is collected, an anode suspended from said top, a separator of non-conducting material over said anode formed to inclose a narrow oxygen-collecting chamber the walls of which extend a distance below the normal electrolyte level, and a sack of non-conducting material depending from said separator and inclosing the anode below the normal electrolyte level, and a sack of electrolyte level.

13. A cell for electrolytic dissociation of water having a cathode, a top beneath which hydrogen is collected, a separator of non-conducting material beneath said top formed to inclose a narrow oxygen-collecting chamber the walls of which extend below the normal electrolyte level, a conducting bar beneath the top of said separator, an anode comprising spaced adjacent side portions united at the top to said bar, a diaphragm of non-conducting material fastened to said separator and inclosing the anode below the level of the electrolyte, and supporting and conducting means secured to said bar and passing through the separator and receiving support from said top.

Signed at New York city, N. Y., this 25th day of August, 1913.

GEORGE HALTER.

In the presence of—
  Jos. D. Edelson,
  Robert Beyer.

Correction in Letters Patent No. 1,172,885.

It is hereby certified that in Letters Patent No. 1,172,885, granted February 22, 1916, upon the application of George Halter, of New York, N. Y., for an improvement in "Apparatus for the Production of Oxygen and Hydrogen Gases," an error appears in the printed specification requiring correction as follows: Page 3, line 101, claim 12, strike out the words "normal electrolyte level, and a sack of;" and that the said Letters Patent should be read with this correction therein that the same may conform to the record of the case in the Patent Office.

Signed and sealed this 11th day of March, A. D., 1919

[SEAL.]

R. F. WHITEHEAD,

*Acting Commissioner of Patents.*

Cl. 204—9.